Sept. 4, 1928.
C. M. CONRADSON
SELECTIVE GEARED HEAD LATHE
Original Filed Dec. 15, 1919    5 Sheets-Sheet 3
1,683,448
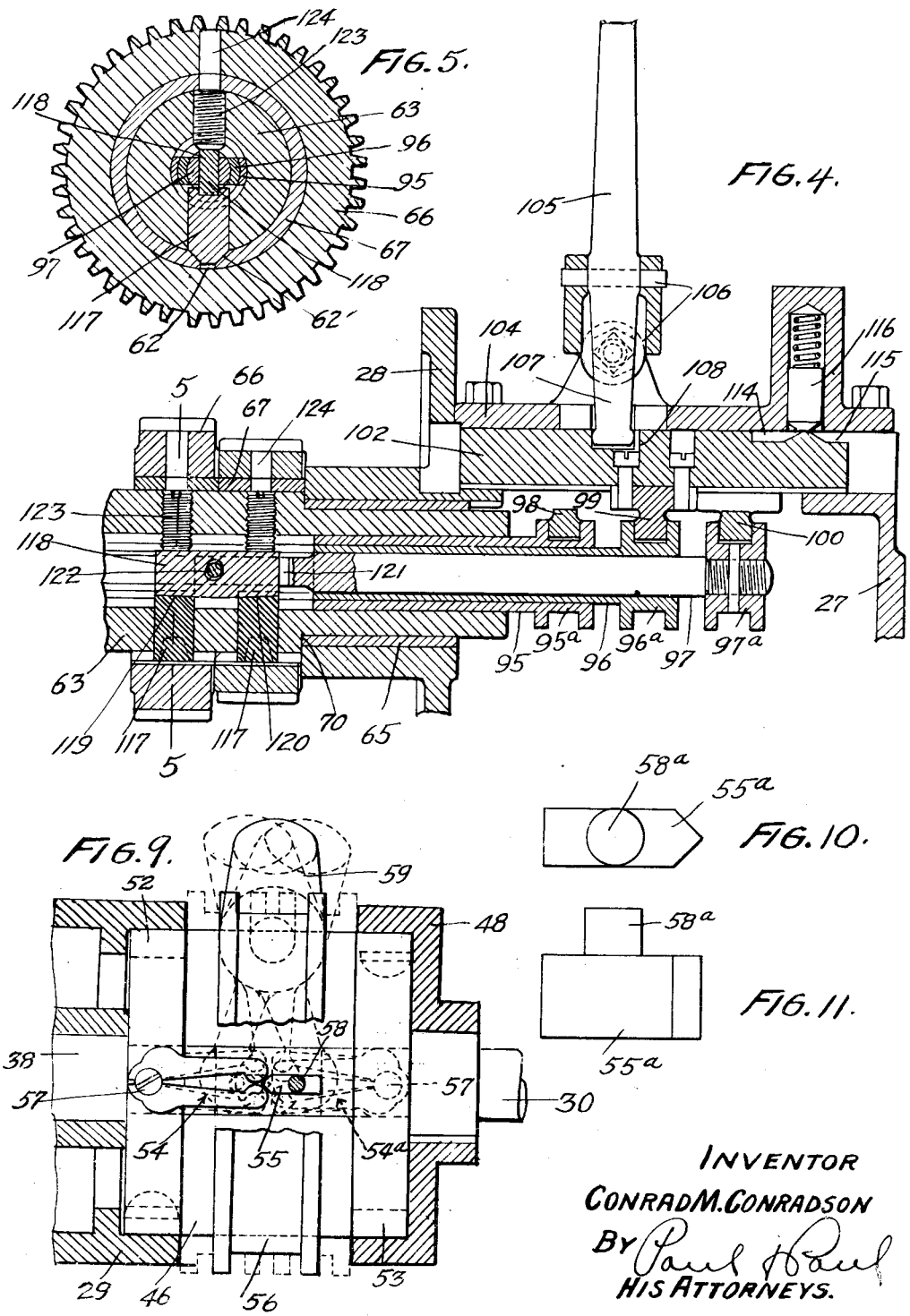
INVENTOR
CONRAD M. CONRADSON
BY Paul & Paul
HIS ATTORNEYS.

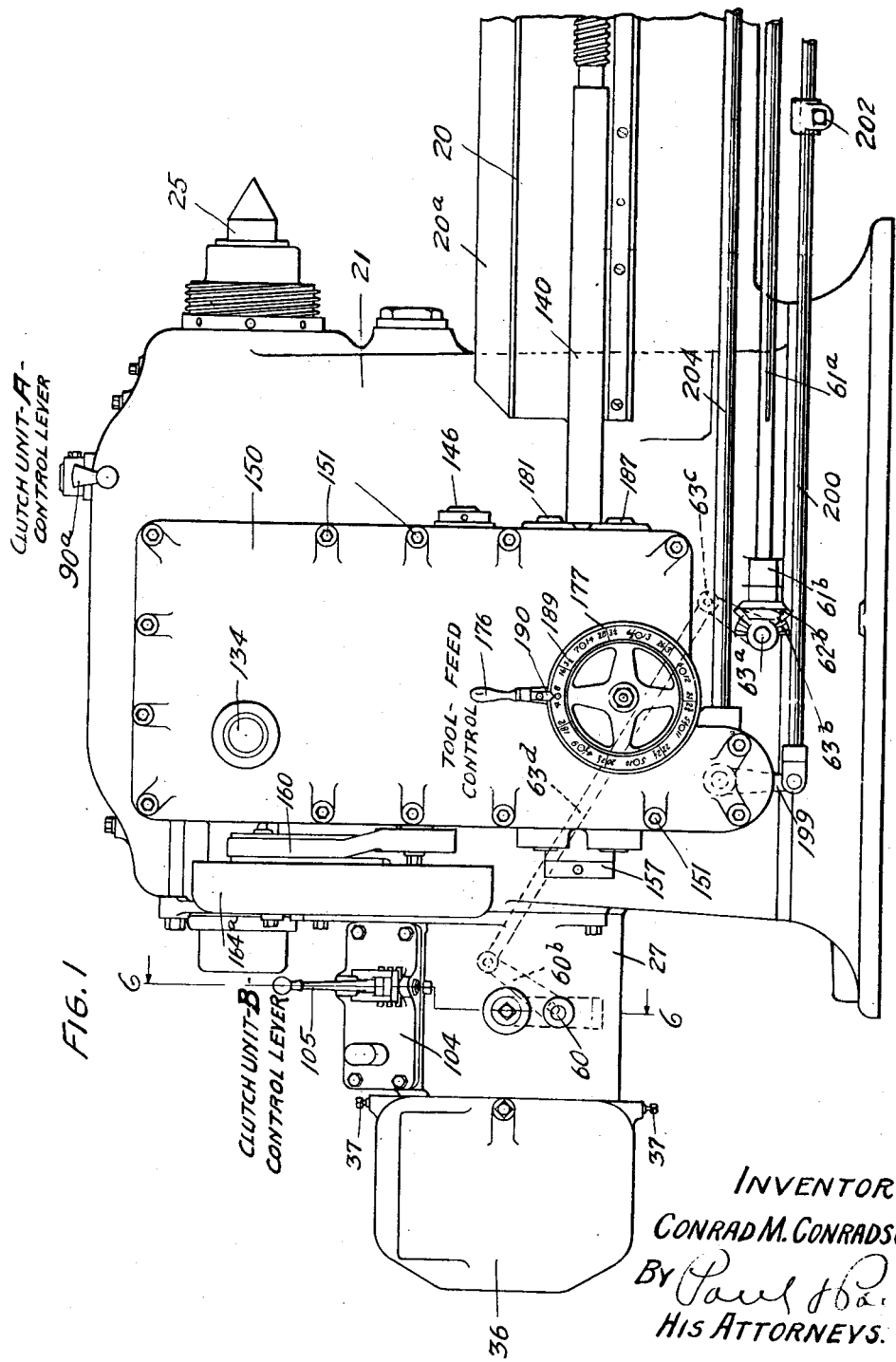

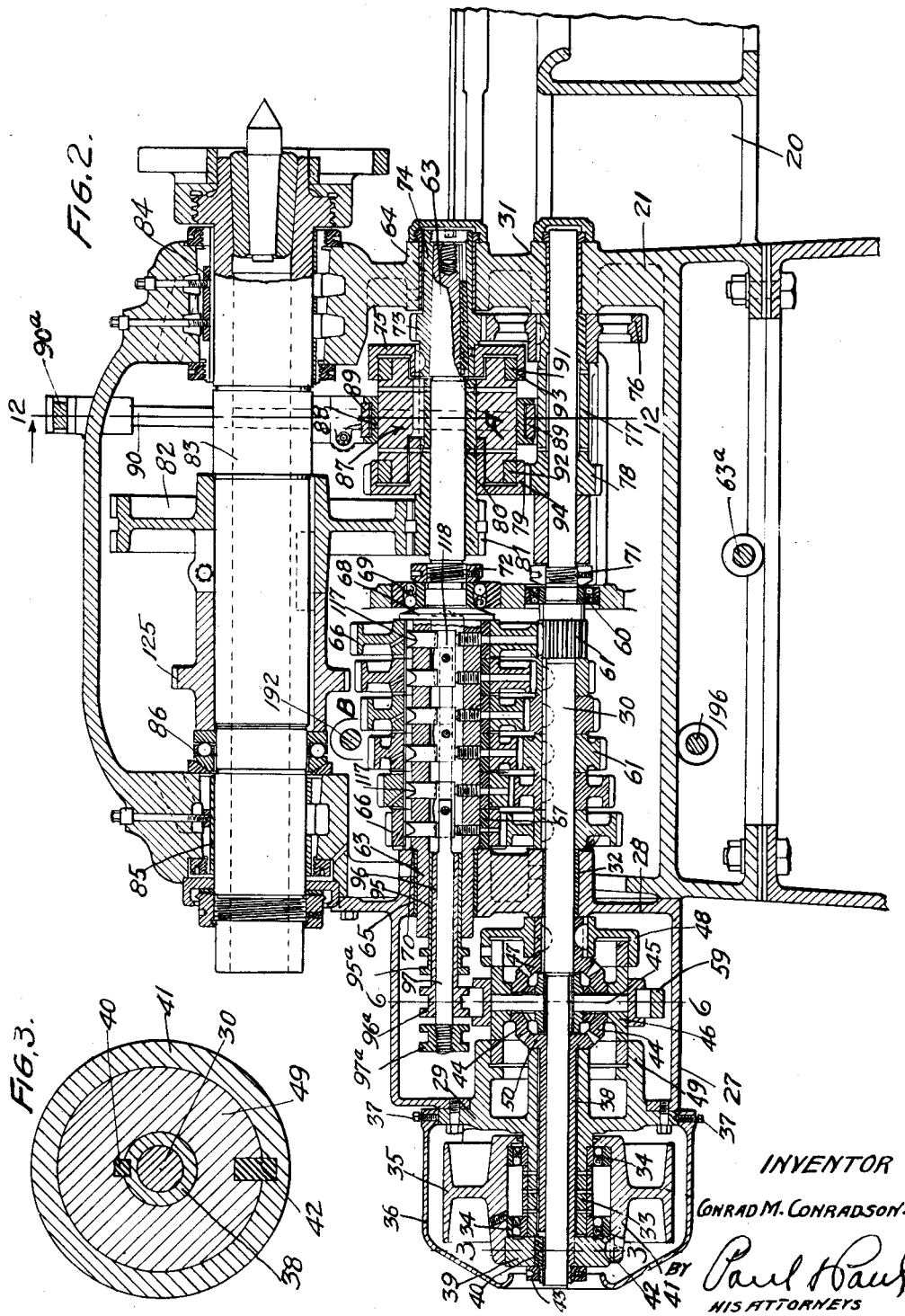

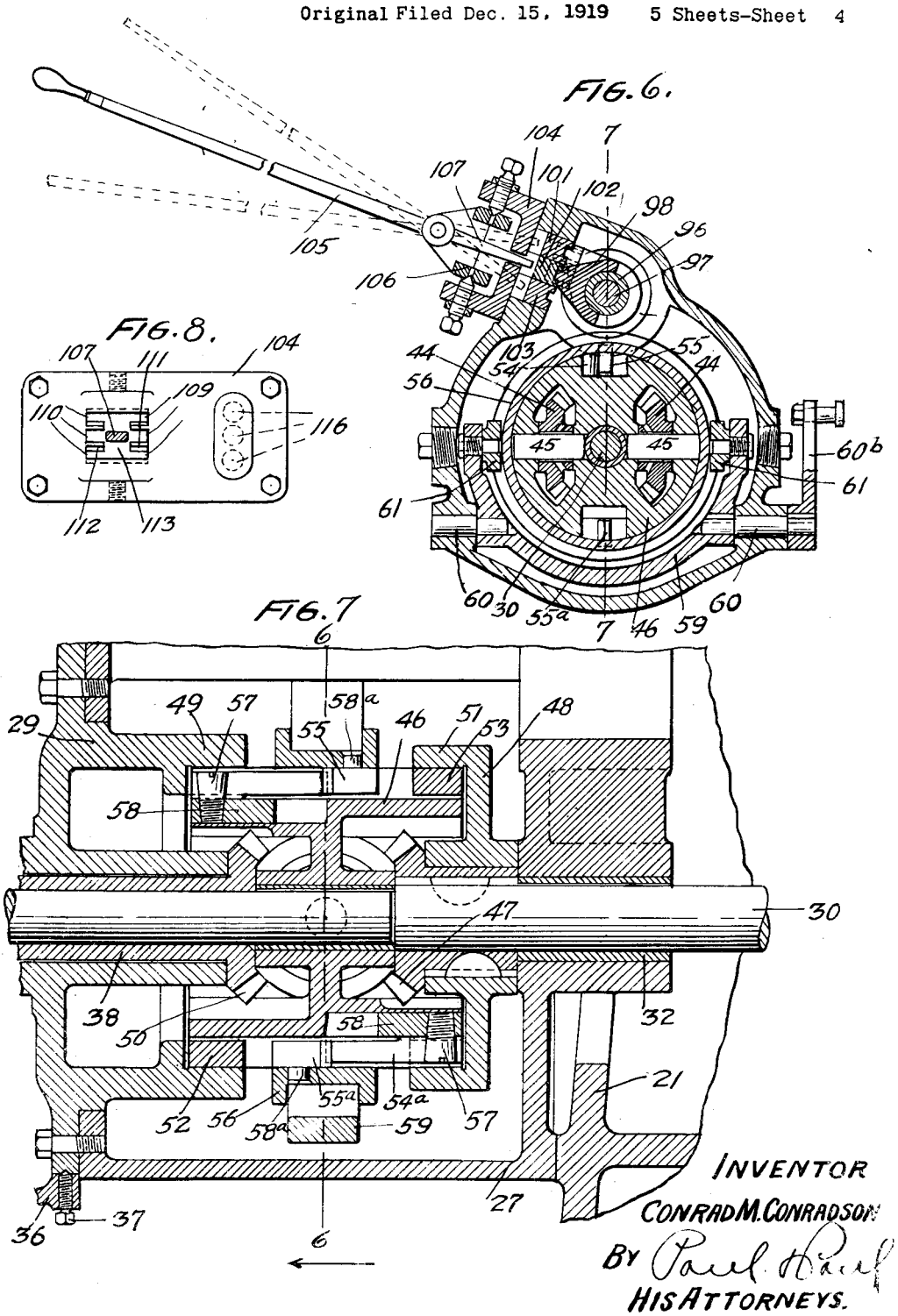

Sept. 4, 1928. 1,683,448
C. M. CONRADSON
SELECTIVE GEARED HEAD LATHE
Original Filed Dec. 15, 1919   5 Sheets-Sheet 5
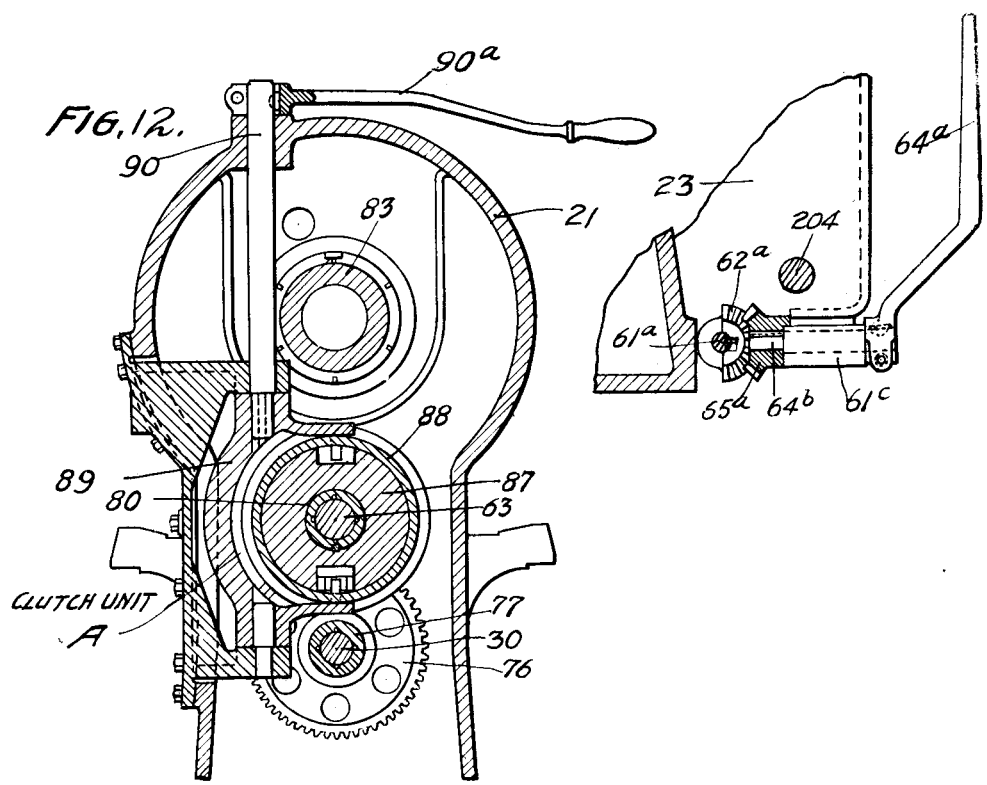
INVENTOR
CONRAD M. CONRADSON
BY Paul Paul
HIS ATTORNEYS.

Patented Sept. 4, 1928.

1,683,448

UNITED STATES PATENT OFFICE.

CONRAD M. CONRADSON, OF MADISON, WISCONSIN, ASSIGNOR TO JOSEPH T. RYERSON AND SON, OF CHICAGO, ILLINOIS, A CORPORATION OF ILLINOIS.

SELECTIVE GEARED HEAD LATHE.

Application filed December 15, 1919, Serial No. 344,845. Renewed November 30, 1925.

My invention relates to machines for turning, boring, drilling or any rotary metal cutting operations, and the object of the invention is to provide a machine for this class of work that will have a wide range of cutting and feeding speeds and attain the highest degree of efficiency and speed for work with different cutting tools, in metals varying widely in degrees of hardness and cutting qualities.

Further objects are to provide means whereby any one of a series of cutting speeds for the spindle may be selected and made effective by the movement of a single lever and means for positively preventing more than one set of change speed gears from being put in operative connection at the same time. A cardinal object is to arrange for only one speed of the primary driving shaft and adapt the machine so that either a single drive pulley or an individual motor may be attached to the drive shaft without alteration in the construction of the machine. Means are also provided whereby the operating friction clutches are run at a comparatively high speed, thus accelerating the action of their operation and reducing the working strain on the parts.

While I have shown my invention applied to a lathe, it will be understood that it may be adapted as a variable speed mechanism for other classes of machines.

My invention consists in various constructions and combinations, all as hereinafter described and particularly pointed out in the claims.

In the accompanying drawings forming part of this specification,

Figure 1 is a side elevation of the head stock end of a lathe having my invention applied thereto, Figure 2 is a longitudinal section of the head end of the lathe, Figure 3 is a detail section on the line 3—3 of Figure 2, Figure 4 is an enlarged detail section showing another form of selective gear clutches used in the speed change gear transmission to the cutting spindle, Figure 5 is a detail section on the line 5—5 of Figure 4, Figure 6 is a detail section on the line 6—6 of Figures 1 and 2, showing the driving parts in a different position, Figure 7 is a transverse section on the line 7—7 of Figure 6, Figure 8 is a detail view of the gridiron plate shown in Figure 6, Figure 9 is a detail view of the clutch-actuating mechanism, being a partial plan view of Figure 7, Figures 10 and 11 are details of the wedge block for actuating the clutch mechanism shown in Figure 9, Figure 12 is a section on the line 12—12 of Figure 2, Figure 13 is a detail sectional view of the lever mechanism at the front of the machine for operating the drive shaft clutch device.

Referring to Figures 1 and 2 in the drawing, 20 represents the main frame or bed of the lathe, having the hollow head stock 21 rigidly secured and a tail stock and tool carriage (not shown), slidably supported on the bed 20 in the usual manner.

The head stock 21 has a centering plug of any usual or any preferred construction, a detailed description not being necessary.

Passing to the primary drive mechanism and referring to Figures 2 and 7, a cylindrical housing 27 having heads 28 and 29 is firmly attached to the hollow head stock 21 and closes the rear entrance to its interior. The primary driving shaft 30 is mounted in bearings 31 and 32 in the head stock 21 and housing 27 respectively and extends through the housing head 29. A trunnion 33 projects integrally from this head upon which is mounted the anti-friction bearings 34 for a driving pulley 35, and I prefer to enclose the pulley by a removable bonnet 36, fastened to the head 29 by set screws 37. Passing through the head 29 and loosely mounted on the shaft 30 is a sleeve 38, having on its outer end a driving collar 39 rigidly secured to the sleeve by a key 40, (see Figure 2) and also to the pulley hub 41 by a key 42. The sleeve 38 is shouldered and a threaded collar 43 secures the key 40 and holds the collar 39 firmly against the shoulder. It will be seen that the sleeve 38 and projecting end of the shaft 30 are supported by the trunnion 33, the sleeve having bearings on the shaft free from the head 29, and that a rotation of the pulley 35 causes a corresponding rotation of the sleeve 38 independent of the shaft 30. A bevel gear 50 is formed integrally with the sleeve 38 and meshes with bevel gears 44 loosely mounted on pins 45 in a planetary gear carrier 46, that is rotatably mounted on the shaft 30. The bevel gears 44 also are in mesh with a bevel gear 47 keyed to the shaft 30 and to an internal friction clutch disc 48 arranged on the hub of the bevel gear 47. A rim 49 (see Figure 7) provided with an internal clutch surface forms an integral part of the head 29 and the gear carrier projects under this rim and also under the clutch rim 51 of the disc 48. Expansible clutch rings 52 and 53 are arranged to rotate with the gear carrier 46 and are adapted to be forced in clutch contact with the clutch rims 49 and 51 respectively, by means of the cam arms 54 and 54ª, wedge blocks 55 and 55ª and shifter collar 56. (Figures 6, 7 and 9.) The cam arms 54 are pivotally supported on the gear carrier 46 by screws 57 in a block 58 and the wedge blocks 55 are loosely connected to the shifter collar 56 by studs 58ª. The collar 56 is actuated to slide on the carrier 46 by means of the yoke lever 59, pivoted at 60 and carrying blocks 61 between the flanges of the collar 56. (See Figure 6.)

The yoke lever 59 is secured to a short shaft 60 forming the pivot for the yoke and extending through the casing 27, and in the rear of the machine is provided with a rigidly fastened arm 60ᵇ. Means are provided for operating this arm from a convenient place in front of the machine as follows:

A shaft 61ª is arranged longitudinally in bearings 61ᵇ and bracket bearings 61ᶜ on the front side of the machine, (see Figure 1) and carries gear sectors 62ª and 62ᵇ. A transverse shaft 63ª has bearings in the head stock 21 and is at the front of the machine provided with a sector-bevel gear 63ᵇ, meshing with the sector gear 62ᵇ and at the rear of the machine with an arm 63ᶜ connected to the arm 60ᵇ by a link 63ᵈ. An operating handle 64ª is fastened to a short shaft 64ᵇ having bearings in the bracket 61ᶜ and a sector bevel gear 65ª in mesh with the sector gear 62ª is also fastened to the shaft 64ᵇ. The gear 62ª is splined on the shaft 61ª to slide thereon and the bracket 61ᶜ is mounted on the tool carriage 23. It is clear with this construction that when the operating handle 64ª is moved in either direction from the neutral position, the yoke lever 59 will be moved correspondingly through the arm 60ᵇ, link 63ᵈ, arm 63ᶜ, shafts 63ª, 61ª and 64ᵇ, carrying the series of intermeshing bevel gear sectors as above described.

When the shifter collar 56 is held in the neutral center position shown in full lines in Figure 9, with both clutches out of operative contact, the rotating pulley, turning freely on the anti-friction bearings 34 and revolving the sleeve 38 through the driving collar 39 and bevel gears 50, 44 and 47, will turn the gear carrier 46 at one-half the speed in the same direction as the pulley, the clutch disc 48 and drive shaft 30 meantime remaining stationary. If the shifter collar is now thrown to the right, the wedge block 55ª will separate the cam arms 54ª and by cam action expand the clutch ring 52 to make gripping contact with the rim 51 of the clutch disc 48, thereby locking the bevel gears and revolving the drive shaft with the pulley. If the machine is to be reversed, the shifter collar is thrown towards the left, a sufficient distance to force the wedge block 55 between the cam arm 54 and make clutch contact between the clutch ring 52 and stationary rim 49. This action has the effect of checking or stopping the rotation of the gear carrier 46 and the rotation of the pulley 35, collar 39 and sleeve gear 50, thereby causing the drive shaft 30 to be rotated in the reverse direction through the bevel gears 44 and 47. It will be here understood that when a reversible electric motor is used as an individual motive power the above-described mechanism is dispensed with and the drive shaft 30 coupled direct to the motor.

*The spindle drive and speed change mechanism.*

It will be noted that there are two independent speed changing clutch units A and B, the one supplementing the other.

Referring particularly to Figure 2, an intermediate anti-friction bearing 60 is provided for the shaft 30 between which and the bearing 32 a series of spur gears 61 of varying diameters are keyed to the shaft 30, the smallest one being integral with the shaft. A counter or transmission shaft 63 is mounted in bearings 64 and 65 and carries a series of gears 66 in mesh with the gears 61. These gears, which will hereinafter be referred to as clutch unit B, normally rotate loosely upon the shaft 63 between a flange 68 on the shaft 63 and the bearing 65. The flange 68 bears against the inner race ring of an intermediate anti-friction bearing 69 and the shaft 63, being provided with a shoulder 70, is kept from endwise movement by the bearings 65 and 69. Threaded collars 71 and 72 secure the inner race rings of the bearings 60 and 69 to the shafts 30 and 63 respectively.

Clutch unit A controls the final spindle drive and is constructed as follows: A gear 73 is keyed to the shaft 63 and its hub 74 is journalled in the bearing 64. A clutch disc 75 is keyed to the hub of the gear 73 and this gear and clutch disc 75 therefore rotate together with the shaft 63. A larger gear 76, meshing with the pinion 73, is secured firmly to one end of a sleeve 77 mounted rotatably on the drive shaft 30 and having an integral pinion or smaller gear 78 at the other end meshing with a clutch gear 79 loosely mounted on a geared driving hub or sleeve 80 upon the shaft 63. The gear 81 of this sleeve is of the herringbone type and is in constant mesh with the large herringbone gear 82 securely fastened by keys and clamp bolts to the lathe spindle 83. This spindle is journaled in bearings 84 and 85 in the head stock 21 and is also provided with the anti-friction thrust bearing 86. The driving sleeve 80 may rotate freely upon the intermediate shaft 63, but is keyed to a clutch collar 87 having a shifter ring 88 operated through a yoke 89 on a rock shaft 90, the shaft being provided with a handle 90ª in convenient reach of the operator (Figures 2 and 12). The clutch collar 87 carries expansible clutch rings 91 and 92 in position to engage and grip the internal clutch rings 93 and 94 of the clutch disc 75 and clutch gear 79 respectively. As the clutch gear 79 is rotating at a much slower speed through the gears 73, 76 and 78 than the direct driven clutch disc 75, it is evident that the speed of the geared driving sleeve 80 and spindle 83 will vary accordingly as the clutch collar 87 is put in operative connection with clutch discs 75 or clutch gear 79. The clutch gripping mechanism in connection with the shifter ring 88 is substantially identical with the mechanism of the primary drive clutch and is not, therefore, shown or described in detail. The two spindle speeds obtained by clutch unit A are independent of the multiple speeds obtained by the clutch unit B and doubles the number of available spindle speeds in the machine.

By reference to Figures 2 and 4 it will hereinafter be shown that any selected speed of a series of six different speeds for the shaft 63 may be obtained by the manipulation of a single lever and that interference in the shift and double gear engagement is made impossible. This mechanism is referred to as unit B and is as follows: The rear or left hand portion of the transmission shaft 63 is hollow and cam sleeves or rods 95 and 96 and 97 having rear flanged collars 95ª, 96ª and 97ª respectively are arranged slidably in the hollow space of the shaft. The flanges of the collars 95ª, 96ª and 97ª are engaged by fingers 98, 99 and 100 attached to shifter bars 101, 102 and 103 slidably mounted in the housing 27 below a plate 104 (Figure 6). A hand lever 105 has universal bearing connections 106 with the plate 104 and its lower end 107 is adapted, when in a central or neutral position, to engage suitable notches 108 in the shifter bars 101, 102 and 103 (Figure 4). A gridiron section in the plate 104 has three opposite slots 109 and 110, intervening tongues 111 and 112 and central slots 113, by means of which the lever 105 can be swung laterally to engage any selected one of the shifter bars but is prevented from moving more than one bar at the same time (Figure 8). After engaging the notch 108 in a shifter bar the lever may be swung to move the bar and the corresponding cam sleeve in either direction. The shifter bars 101, 102 and 103 are preferably provided with notches 114 and 115 and spring pressed bolts 116 are arranged to drop into one of these notches when a bar is moved and lock the bar in the assumed position (Figure 4). The movement of any one of these bars and the corresponding cam sleeve from the neutral position in either direction effects a clutch connection with one of the gears 66 and each shifter bar controls two gears of the series.

Referring particularly to Figures 5 and 6, it is seen that the ring bushings 67, upon which the gears 66 normally rotate, are split at 62 and beveled cam surfaces 62′ are arranged at the split upon which wedge bolts 117 bear. These bolts have slidable bearings in the wall of the shaft 63 and passing to the interior of the shaft contact with beveled cams 118 connected to the cam sleeves 95, 96 and 97. Each of the cams 118 has two cam surfaces 119 and 120 beveled in opposite directions, as shown most clearly in Figure 4, and are adjustably connected to their respective cam sleeve in a slot 121 by a pin 122 passing through holes in the sleeve and a slightly enlarged hole in the cam. Adjusting screws 123, accessible through holes 124 in the gears and bushings bear against the back of the cams and serve as thrust supports for the cams and also as a means whereby the wedge bolts 117 may be accurately adjusted with respect to the cam surface, so that a slight longitudinal movement of the cams in either direction will force one of the wedge bolts outwards and expand the ring bushings to clutch the gear 66 and thus rotate the shaft 63. The angle of the opposite cam surfaces 119 and 120 can thereby be made so slight that a light pressure on a cam sleeve will suffice to clutch a gear, the direction of the pressure of the sleeve being determined by the selected gear of a pair. Assuming that a certain spindle speed is required for a certain class of work, the requisite gear 66 is selected for the transmission of that speed to the spindle. The cam sleeve controlling the pair of gears, of which the selected gear is one, being known, the hand lever 105 is brought into engagement with that cam sleeve and the lever thrown to move the sleeve in the required direction to clutch the selected gear. The speed of the drive shaft 30 and the speed ratio of the transmission shaft 63 for any one of the gears 66 being known, as well as the speed ratio of the transmission shaft and spindle, both in direct and reduced ratio as controlled by the clutch unit A, the hand lever 90ª controlling this clutch unit is moved to either the direct or reduced ratio, as may be required, after which the hand lever 105 controlling the clutch unit B is moved to the required one of the six positions in the gridiron plate 104, when the selected spindle speed is obtained.

Various modifications of the details of construction may be made without departing from the principle and scope of this invention and I do not, therefore, wish to confine myself strictly to the constructions shown and described.

I claim as my invention:

1. The combination with a head stock, of a driving shaft journaled in the lower portion thereof and having a driving connection at one end, an intermediate shaft journaled in said head stock, gears secured on said driving shaft, a clutch control gear unit on said intermediate shaft engaging the gears of said driving shaft, a work-supporting spindle adjacent said intermediate shaft, a pinion secured on said intermediate shaft, a sleeve having a driving connection with said pinion and geared to said spindle, and a second sleeve geared to said pinion and having a driving connection with said first-named sleeve.

2. The combination with a head stock, of a driving shaft journaled therein, a series of gears secured on said driving shaft, an intermediate shaft journaled in said head stock, a series of gears loosely mounted on said intermediate shaft, means for selectively locking said loosely mounted gears on said intermediate shaft, a work-supporting spindle journaled in said head stock, a comparatively large gear secured thereon, a sleeve having a driving connection with said spindle gear and with said intermediate shaft, and a sleeve having a driving connection with said intermediate shaft and with said first-named sleeve.

3. The combination, with a driving shaft and a series of gears of different diameter secured therein, of an intermediate hollow shaft, a series of gears loosely mounted on said hollow shaft and meshing with the gears of said driving shaft, wedge-bolts mounted in said hollow shaft for engaging and locking said gears respectively, bars for operating said wedge-bolts, means for moving said bars longitudinally to adjust said bolts to their locking or releasing position, screws mounted in said hollow shaft for adjusting said wedge-bolts, a work-supporting rotating member and driving connections between said rotating member and said intermediate shaft.

4. The combination, with a frame and a housing projecting outwardly at one end thereof, of a driving shaft journaled in said frame and housing, a driving connection for said shaft also within said housing, a series of gears of different sizes secured on said driving shaft, an intermediate shaft projecting into said housing, gears of varying sizes loosely mounted thereon and meshing with the gears of said driving shaft, means for selectively locking the gears of said intermediate shaft thereon, a work-supporting spindle, and an indirect independent driving connection comprising a member loosely mounted on said drive shaft and geared to said intermediate shaft and said spindle.

5. A multi-speed transmission control mechanism comprising a driving shaft, a series of gears secured thereon, an intermediate shaft, a series of gears loosely mounted on said intermediate shaft and meshing with the gears of said driving shaft, means for selectively locking said intermediate shaft gears thereon, a work-holding spindle adjacent said intermediate shaft, a pinion secured on said intermediate shaft, a clutch disc secured to said pinion, a sleeve loosely mounted on said intermediate shaft and having a driving connection with said work-holding spindle, a second clutch disc loosely mounted on said sleeve, a clutch member splined on said sleeve for alternately engaging said clutch discs, and a sleeve loosely mounted on said drive shaft and having driving connections with said pinion and with said second clutch disc.

6. A multi-speed transmission control comprising a driving shaft, a series of gears secured on said shaft, an intermediate shaft arranged adjacent said driving shaft, a series of gears loosely mounted on said intermediate shaft and meshing with the gears of said driving shaft, means for selectively locking said intermediate shaft gears thereon, a work-holding spindle adjacent said intermediate shaft, a sleeve having a herringbone pinion, a herringbone gear on said work-holding spindle meshing with said pinion, and a pinion mounted on said intermediate shaft and having two-speed clutch and gear connections with said sleeve and said herringbone pinion.

7. The combination with a head stock, of a drive shaft journaled in the lower portion thereof and projecting outwardly therefrom at one end, a sleeve loosely mounted on the extension of said drive shaft and having a forward and reverse driving clutch connection with said shaft, means mounted on said sleeve for transmitting power thereto and to said shaft, a series of gears secured on said drive shaft within said head stock, an intermediate shaft mounted in said head stock adjacent said drive shaft, a series of gears loosely mounted on said intermediate shaft and meshing with the gears of said driving shaft, means for selectively locking said intermediate shaft gears thereon, a work-holding spindle mounted in said head stock, and a gear secured to said spindle and having a driving connection with said intermediate shaft.

8. The combination with a head stock and a housing secured to the rear portion thereof and forming an extension therefor, a driving shaft journaled in the lower portion of said head stock and projecting through said housing, a sleeve loosely mounted on the extension of said driving shaft and projecting beyond said housing and having a forward and reverse driving connection with said driving shaft, a means for transmitting power mounted on said sleeve, an intermediate shaft journaled in said head stock, a series of gears secured on said driving shaft, a series of gears loosely mounted on said intermediate shaft and meshing with the gears of said driving shaft, means for selectively locking said intermediate shaft gears thereon, a work-holding spindle journaled in said head stock, and a driving connection between said work-holding spindle and said intermediate shaft.

In witness whereof, I have hereunto set my hand this 10th day of December, 1919.

CONRAD M. CONRADSON.